(12) United States Patent
Cameron

(10) Patent No.: US 12,206,442 B2
(45) Date of Patent: Jan. 21, 2025

(54) SMART SERDES

(71) Applicant: D Kevin Cameron, Sunnyvale, CA (US)

(72) Inventor: D Kevin Cameron, Sunnyvale, CA (US)

(*) Notice: Subject to any disclaimer, the term of this patent is extended or adjusted under 35 U.S.C. 154(b) by 0 days.

(21) Appl. No.: 18/135,735

(22) Filed: Apr. 17, 2023

(65) Prior Publication Data

US 2023/0336198 A1     Oct. 19, 2023

Related U.S. Application Data

(60) Provisional application No. 63/331,854, filed on Apr. 17, 2022.

(51) Int. Cl.
*H04B 1/10*     (2006.01)

(52) U.S. Cl.
CPC ..................... *H04B 1/10* (2013.01)

(58) Field of Classification Search
CPC .......... H03K 5/135; H03M 1/10; H03M 1/34; H04B 1/10; H04L 1/00; H04L 1/20; H04L 25/02; H04L 25/03; H04L 29/06

USPC ............................................ 375/19, 316, 340
See application file for complete search history.

(56) References Cited

U.S. PATENT DOCUMENTS

| | | | |
|---|---|---|---|
| 11,423,303 B1* | 8/2022 | Jiao ........................ | H03G 5/165 |
| 2019/0386773 A1* | 12/2019 | Nir ........................ | H04L 1/0058 |
| 2023/0146174 A1* | 5/2023 | Kim ..................... | H04B 17/3912 |
| | | | 703/2 |

* cited by examiner

*Primary Examiner* — Shawkat M Ali

(57) ABSTRACT

A system, method, and apparatus for serializer/deserializer (SERDES) communication. In one embodiment, power consumption is reduced by tuning links individually for best speed and/or bit error rate (BER) through use of one or more of i) low-level link management; ii) avoiding multiplexing of channels where it impacts performance, and iii) enabling peer-to-peer (p2p) communications in ostensibly master/servant scenarios. Fine tuning of link behavior is achieved with one or more techniques including i) analog-artificial intelligence (AI) methods, rather than traditional adaptive/digital signal processing (DSP) filtering; ii) efficient power level setting; and iii) feed-forward control.

26 Claims, 4 Drawing Sheets

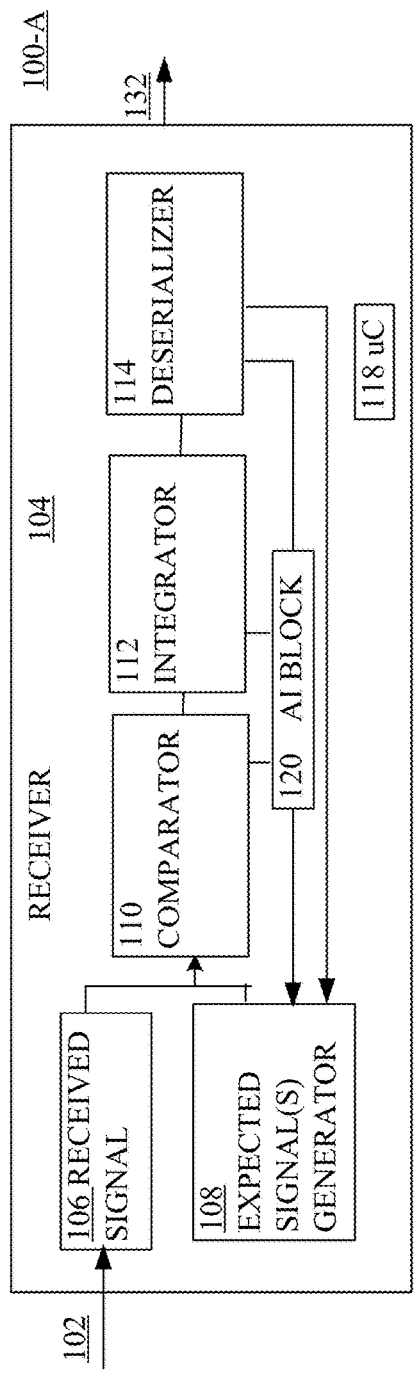
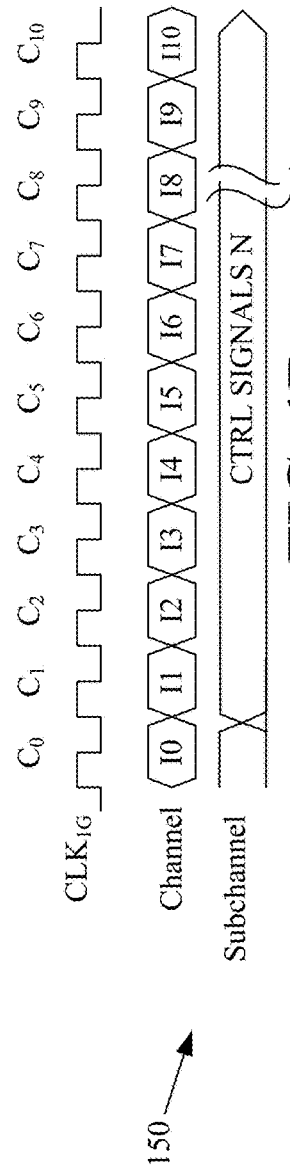
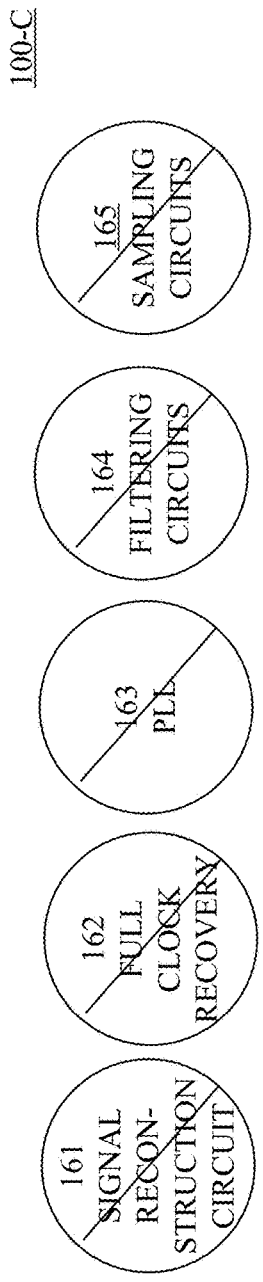
FIG. 1A
FIG. 1B
FIG. 1C

SMART SERDES

CROSS-REFERENCE TO RELATED APPLICATIONS

This application claims priority to provisional application Ser. No. 63/331,854, filed Apr. 17, 2022, titled "SMART SERDES", the disclosure of said application is incorporated by reference herein in its entirety.

FIELD OF TECHNOLOGY

This disclosure relates generally to the technical fields of electronic communication, and in one example embodiment, this disclosure relates to a method, apparatus and system of serializer/deserializer (SERDES) communication.

BACKGROUND

SERDES links are used extensively in communication, and are required to run at much higher frequencies than other components in order to avoid being a bottleneck in data processing and computation. A processor running at 1 GHz operating on 64 bit words in a pipeline with other processors requires the connecting SERDES link runs at least 64 GHz (with simple coding) to avoid being IO bound. If the SERDES channel is multiplexed (as in Ethernet, PCIe and USB), then even higher rates are required. However, running at full speed and full voltage on every SERDES link in a system consumes unnecessary amounts of power, and becomes a limiting factor on overall performance.

Standard filtering for SERDES applications involves cleaning up the signal such that clean "eyes" are formed, and the signal is sampled in the middle of the eye (to determine whether a logical 1 or 0).

SUMMARY

The claims define the matter for protection. Disclosed in the specification is an apparatus, method and system relating electronic communication, and in one embodiment a serializer/deserializer (SERDES) communication.

"Smart SERDES" reduces power consumption by tuning links individually for best speed and/or bit error rate (BER) through use of one or more of i) low-level link management; ii) avoiding multiplexing of channels where it impacts performance, and iii) enabling peer-to-peer (p2p) communications in ostensibly master/servant scenarios.

Fine tuning of link behavior is achieved with one or more techniques including i) analog-artificial intelligence (AI) methods, rather than traditional adaptive/digital signal processing (DSP) filtering; ii) efficient power level setting; and iii) feed-forward control.

The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense. The present invention is defined by the features of the appended claims.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE VIEW OF DRAWINGS

Example embodiments are described by way of illustrations and are not limited by the figures of the accompanying drawings, wherein:

FIG. 1A is a functional block diagram of a receiver for deserializing a serial signal using AI, according to one or more embodiments.

FIG. 1B is a signal diagram of a channel and subchannel for deserializing a serial signal using AI, according to one or more embodiments.

FIG. 1C is an illustration of hardware or processes not required for deserializing a serial signal using AI, according to one or more embodiments.

Figure 2:
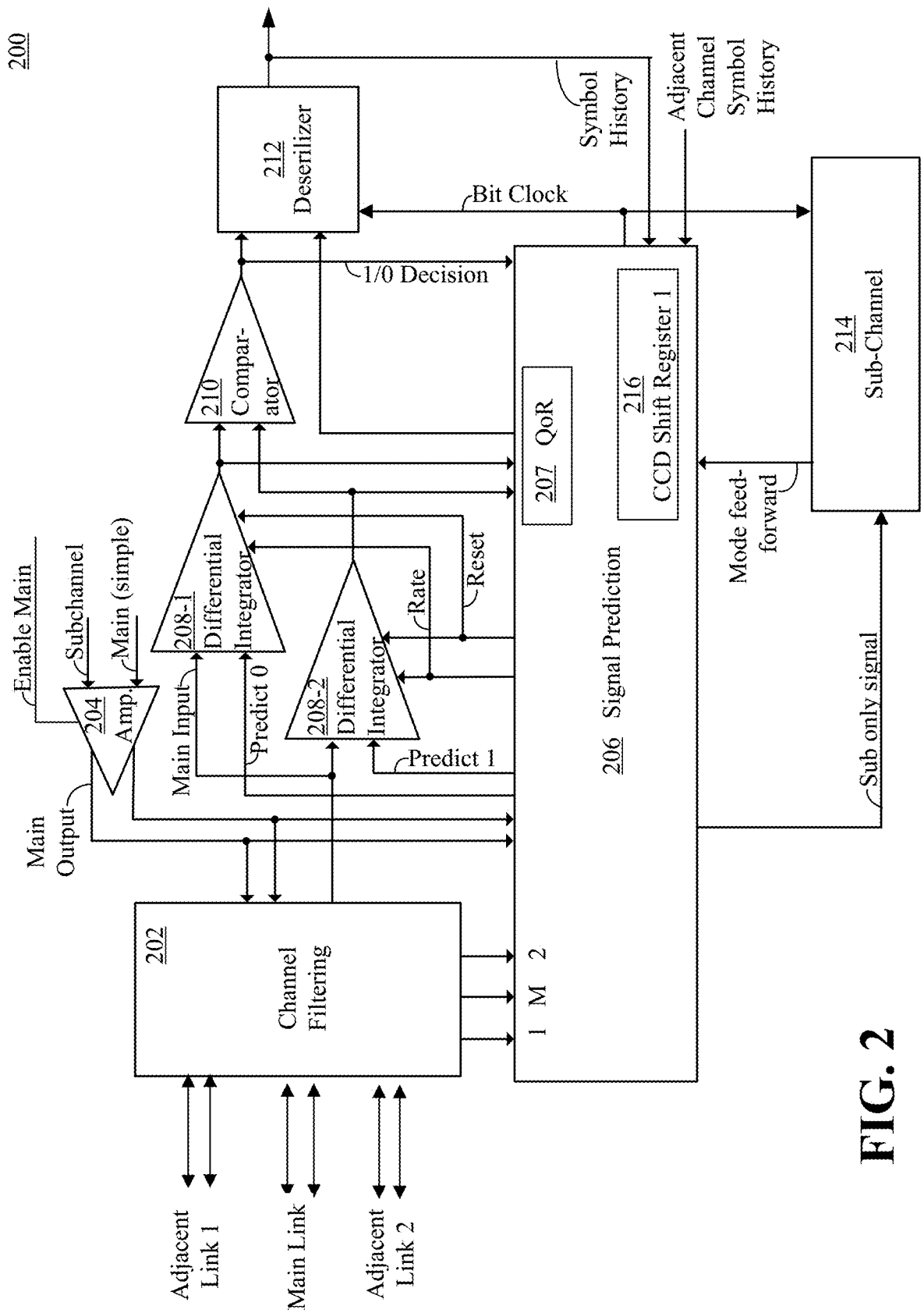
FIG. 2 is a functional block diagram of a front-end receiver for deserializing a serial signal using AI, according to one or more embodiments.

The drawings referred to in this description should be understood as not being drawn to scale, except if specifically noted, in order to show more clearly the details of the present disclosure. Same reference numbers in the drawings indicate like elements throughout the several views. Other features and advantages of the present disclosure will be apparent from accompanying drawings and from the detailed description that follows.

DETAILED DESCRIPTION

A method, apparatus and system of a hierarchy of a SERDES signal processing is disclosed. In the following description, for the purposes of explanation, numerous specific details are set forth in order to provide a thorough understanding of the various embodiments. It will be evident, however to one skilled in the art that various embodiments may be practiced without these specific details.

Referring now to FIG. 1A, a functional block diagram 100-A is shown of a receiver for deserializing a serial signal using AI, according to one or more embodiments. Input signal 102 is received at front end 106 of receiver 104 and communicated to comparator 110, along with an expected signal from expected signal generator 108, for comparison therebetween. The resultant difference is communicated to integrator 112 and then deserializer 114. Artificial intelligence (AI) block 120 is coupled to generator 108, comparator 110, integrator 112, and deserializer 114 for performing automatic/AI filtering of harmonic components of a sent signal via digital or analog circuits. Microcontroller (uC) 118 is disposed in receiver 104 for managing the balance of the components therein. The resultant output signal 132 exits receiver 104 on the right side of the block.

Referring now to FIG. 1B, a signal diagram 150 is shown of a channel and subchannel for deserializing a serial signal using AI, according to one or more embodiments. Channel signal and a much lower rate subchannel signal are communicated on a two-wire serial link, with the latter being used for power control purposes and resend instructions as described below.

Referring now to FIG. 1C, an illustration 100-C is shown of hardware or processes not required for deserializing a serial signal using AI, according to one or more embodiments. One embodiment of the receiver does not require signal reconstruction circuitry 161, while another embodiment does not require full clock recovery 162, and another embodiment does not require a phase lock loop (PLL) 163. Yet other embodiments do not require filtering circuits 164, and finally a last embodiment does not require sampling circuits 165. By not requiring these circuits and processes, the present disclosure saves chip area, power consumption, and complexity.

Referring now to FIG. 2, a functional block diagram 200 is shown of a front-end receiver for deserializing a serial signal using AI, according to one or more embodiments. Channel filtering block 202 receives the main link (M), as well as adjacent links 1 and 2, which are fed into signal prediction block as M, 1, and 2. A main channel (simple) along with a subchannel are received at an amplifier 204 to extract the main channel from the subchannel, which are also fed into both channel filtering block 202 and signal prediction block 206. Difference integrators 208-1 and 208-2, respectively, receive the main input and a predicted, or expected, waveform (e.g., predict 0, predict 1, etc.) in parallel, and the difference is integrated therein and output to comparator 210. Quality of recovery (QoR) function block 207 in signal prediction block 206, provides an output to deserialize 212 for a final output logic value. Sub-channel block 214 receives only the subchannel signal for use in various control functions described below for signal prediction block 206.

In one embodiment, a received signal is interpreted as a symbol, e.g., a one bit symbol with a two level signal for a 1 or a 0 in a non-recurring zero (nrz) protocol. In another embodiment, the symbol can be a four level phase amplitude modulation (PAM) protocol with two bits per symbol. In yet another embodiment, the symbol can be a three level signal for a return to zero (rtz) protocol.

All the information in a standard RTZ SERDES signal is at the link frequency and above, that allows for adding control signals at lower frequency superimposed on the wires (usually a differential pair). Both can be run bidirectionally (bidir), so that the control layer of one end can request resends or protocol changes of the other end in short order, without involving communication software level drivers outside the SERDES driver IC.

The difference of the received signal against the expected signal are integrated over the (entire) symbol period (getting more information) of the signal rather than just sampling at a point in time at the center of the eye, which will improve the signal to noise ratio (SNR).

The present method takes advantage of inter-symbol interference (ISI) by basing prediction on past symbols; so can modify the expected waveform based on immediate precedent, e.g., last four symbols are all logic value 1, so an expected signal can be chosen from a canned (library) of expected waveforms with a bias, based on matching preceding values in the signal.

A collection of possible patterns can be created on individual charge-coupled devices (CCD) shift registers (loops) #1, 216-1, et al., and disposed in the signal prediction block, where each loop acts as an analog shift register that cycles through possible predicted patterns to be picked for the next cycle for decoding the received signal. That is, a particular loop for the next symbol period will be chosen based on a history of the incoming signal. The CCD loop is reinitialized periodically in one embodiment. An alternative to the CCD loop is selecting a sequence of values over the symbol period with a multiplexer (coupled to an array of capacitors with given voltage values for generating the expected waveform).

Standard filtering for SERDES applications involves cleaning up the signal such that clean "eyes" are formed, and the signal is sampled in the middle of the eye. The approach taken here is to use AI prediction of the likely signal trajectory for all possible codes, or logic levels, (usually just 1 or 0), and integrating the absolute (value) difference (or the square of it) between the observed signal and predicted signals. The intended, or given, logic level for the signal is the one associated with a predicted signal having a desired correlation, e.g., the least different integration is taken as the intended code. Other algorithms can be used for selected a given logic level for the signal. Using prediction rather than filtering and sampling provides minimum latency, since no reconstruction of the incoming signal is attempted or required, and timing is not required to be accurate since full clock recovery is neither attempted nor required. The AI function is continually tuned to get best match between the incoming signal and predicted waveforms. The AI block can be implemented in analog or digital circuitry, analog circuitry is preferred in order to avoid digital calculations at the incoming clock speed. The AI block, e.g., signal prediction block 206 will generate reset and sampling signals for the integrator stage, as well as an integration speed signal (rate) (the integration multiplier may be varied to weight measurement differently over the measurement window of a period, see FIG. 3) in different embodiments. In the present embodiment, the AI block is signal prediction block with integrated CCD loop, where the AI prediction of values to assign the capacitors. Least-means squared (LMS) adaptive filtering can be used for this process.

Figure 3:
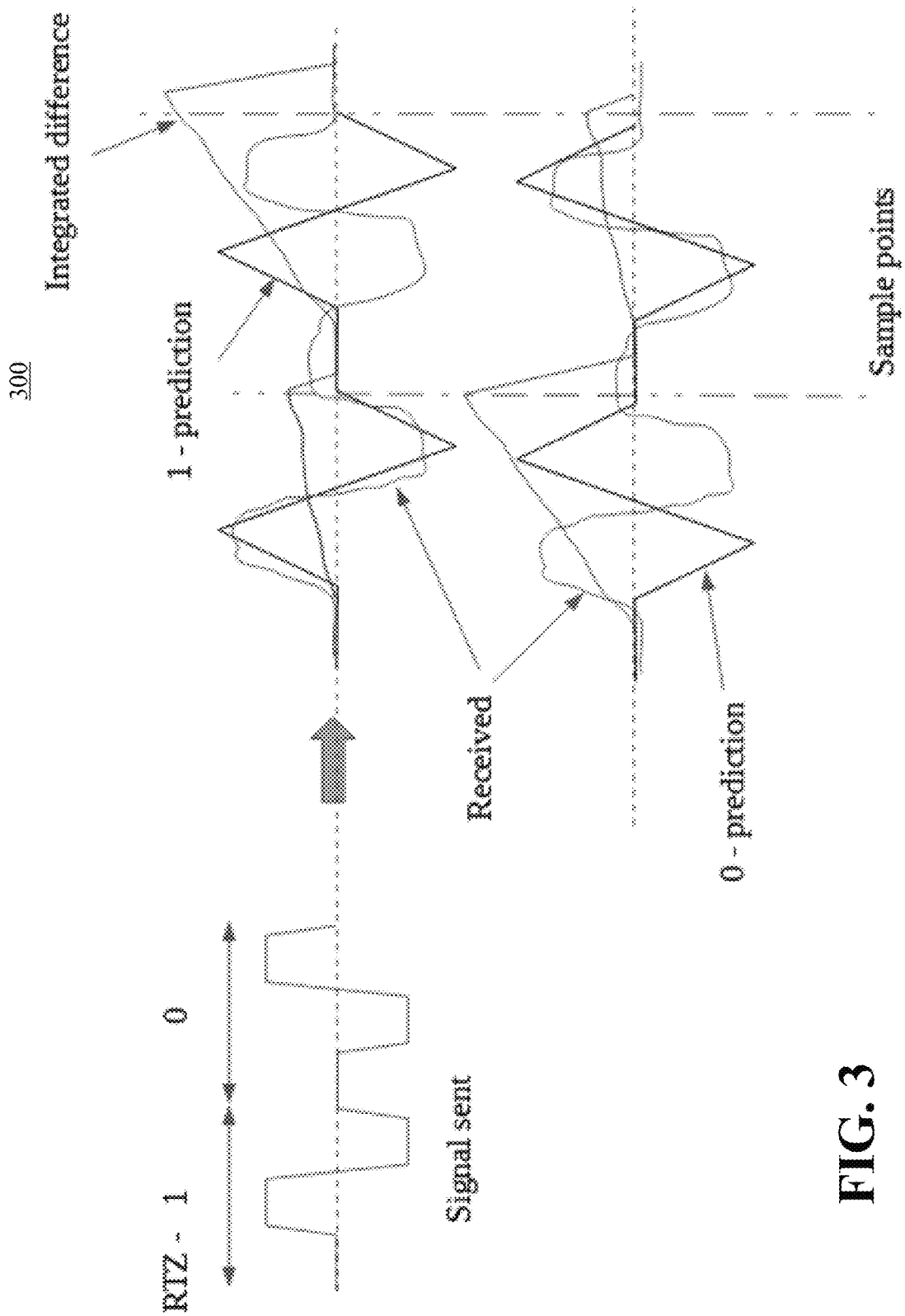
FIG. 3 is a signal diagram of an expected signal construct, or a simple approximation thereof, using a non-automatic/AI filtering of harmonic components of a sent signal via digital or analog circuits, according to one or more embodiments.

A non-automatic/AI (non-adaptive) version would just work out (analytically) the harmonic components of the sent signal, and their delay and attenuation, and then add them together to construct the expected (or predicted) signal, or a simple approximation (as shown in FIG. 3). The AI block may be constructed so that that is possible as the starting condition. The AI/adaptive approach is expected to improve handling in physically variable environments with unknown crosstalk.

The sub-channel signal bit rate is expected to be a straight division of main channel, such that dividing down the bit-sampling signal will give the sample clock for the sub channel making DSP of sub-channel signal easier (no phase-locked loop (PLL) required).

The (AI) signal-prediction function can consider signals from adjacent channels in order to cancel crosstalk, and feed-forward of driver side power status through the sub channel. Channel input filtering can be active or passive, but is aimed at limiting the signal frequency content to that in the transmitted signal, and eliminating sub-channel interference. The sub-channel signal is likely to be at much lower amplitude (initially), so that it can be injected into channels not expecting it without causing problems.

Adequate throughput and low latency are the main requirements of a SERDES link, both depend somewhat on the bit error rate (BER) and how often data needs to be resent. Given the ability to identify failures locally and request resends almost immediately, it is possible to reduce the power being used until the BER rises to a given target limit, e.g., the usable limit for an application.

Each SERDES driver can use power from a capacitor, which is topped up as needed to maintain the Voltage needed. The capacitor can be topped up using a round-robin current feed through an inductor, which can be shorted, to ground when not needed. The inductor would be driven by a switch mode power supply (SMPS), possibly off-chip. The resulting SERDES signal will have triangular amplitude, which could make signal recovery harder on the receiving end, but signaling the power status on the sub-channel enables the receiving AI function to compensate.

Given a fixed dV/dt for driving a line (impedance is a constant), a lower voltage swing takes a shorter time, so speed can be increased as the voltage is reduced.

If non-return-to-zero (NRZ) signaling is used, then a DC bias may accumulate in the channel. In one embodiment, DC bias is cleared by adding dead time between sequences where the line is not driven but instead is shorted with a load to dissipate the accumulated charge. The fastest way to send a single word of data on an NRZ channel is to send the word followed by a short balancing sequence, e.g. the same data reflected, the balancing sequence can be used to confirm the data (as with error correction code (ECC)/parity). The balancing sequence can also be computed as an analog signal which takes the shortest time to transmit, the AI approach is doing single bit recovery and does not do clock recovery (and sampling) like a PLL approach, so the balancing signal can have arbitrary shape and timing.

Signal to noise ratio (SNR) can be improved by modulating the speed such that harmonics are canceled automatically by reflection, also known as standing wave ratio (SWR) minimization in RF parlance). Analog/RF electronics for measuring the line characteristics can be used in a round-robin fashion, and shut down when not in use (some characteristics of the channel will not change after initial setup).

Initial setup would default to some standard scheme like PCIe/Bunch of Wires (BoW)/Universal Chiplet Interconnect Express (UCIe), (on a per-link basis), and optimization will depend on use. A multi-channel Smart SERDES controller can be used to bridge between ICs/IP cores/chiplets that use different standards, e.g. a non-volatile memory express (NVMe) computational storage card using Compute Express Link (CXL) in one embodiment, which is an industry-supported Cache-Coherent Interconnect that can be bridged through to UCIe network chiplet.

IPv6 Overlay

PCIe and USB are master/slave protocols, where all communication between peripherals goes through the master. Internet protocol version 6 (IPv6)/Ethernet is a peer-to-peer networking protocol.

Smarter driver/controller chips can view clients of the SERDES as network endpoints and translate between the protocols, or run them as separate networks on the same links.

In the case of "computational storage" (CS) which plugs in looking like PCIe (NVMe) slave memory, the ability to route traffic between them directly (peer-to-peer, as IPv6) and not through the host improves performance considerably.

PCIe is a flexible standard where the controllers can look like different widths to the host, so a 16× connector can be (virtually) hot-plugged as a 4× and the spare links permanently allocated to IPv6 use. Likewise, the slave end would see a network card being hot-plugged.

Dissociating channels from a particular physical assignment means that channel (AI) training can be done by reassigning the virtual channels such that a channel is not being used for communication during tuning. Given two channels continually swapping which one is in use with the one being tuned provides maximum speed. Virtualizing the channels also provides redundancy when there are many channels with a high probability of some being broken, or when working in an environment where links may fail during use—the Smart SERDES sub-channel can be used to identify a link has failed and reroute in minimal time.

PCIe, Ethernet and USB are "hot-pluggable", so the interfaces can be made present to a host operating system but actual connection not made until needed. Dummy, or virtual, devices can be used to create control points—e.g. something that looks like a network card on a virtual private network (VPN) that just connects to the Smart SERDES control for network discovery (Dynamic Host Configuration Protocol (DHCP), Zero-configuration networking (ZeroConf)).

There are various standards for SERDES level communications, e.g. BoW, UCIe, the goal of having an IPv6 overlay is to be able to do configuration of the network independently of those hard definitions and, in one embodiment, defining the communication protocols dynamically on a per-link basis.

RoT/VPN

Given the ability to do (IPv6) networking, the Smart SERDES ICs (receiver) can be physically identified and used as a root-of-trust (RoT) (with physically unclonable function, aka PUFs), and virtual private networks (VPNs) can be created within a network of Smart SERDES ICs. New hardware being plugged into the network can be connected as a member of a VPN limited to unknown users, and then moved to other VPNs once validated. Low security PCIe modes would not be enabled by default.

Reliability

For high reliability, the same (digital) signal may be sent (transmitted) over multiple physical channels simultaneously—three or more allows for per-bit error correction. Similarly, sending data on one channel and the corresponding cyclical redundancy check (CRC)/ECC data on another reduces latency. For large transfers on a given link error corrections can be requested on the sub-channel or other channels such that the corrections can be made while the main transfer is still in flight. These approaches will give the illusion of 10e-12 BER, on links with BER rates more like 10e-6. The requirement for the low BER comes from the driver level software only being informed about errors very late (high latency), and resends being expensive; Smart SERDES handles recovery at the lowest level of hardware and minimizes the cost by balancing BER with throughput and latency requirements. The higher speed achieved with the higher BER compensates for the correction time/energy cost.

Similarly, a coding scheme using multiple channels (as a parallel pattern) can be used to move more bits per cycle for higher throughput. Since the AI function considers multiple channels for crosstalk rejection anyway, this is mostly handled after the digital signal is recovered.

CRC Correction

The AI filtering/detection approach can be augmented with quality measurement (quality of recovery (QoR)); if a bit is decoded but the AI filtering suspects the value is wrong (due to poor difference) the bit can be tagged as dubious and the information used to guess at the right value later when doing CRC checks, i.e., if there are a few bad bits in a block, trying to fix the most dubious can be done (in parallel) before requesting a resend of the block. Parallelization can be implemented by running multiple deserializers, each with different values for the dubious bits. Likewise, with ECC/parity checking, the most dubious bits would be chosen for correction first. Aggregating the information from the bit decode into the block level allows for reordering the resend to get the most dubious blocks resent first, which may avoid a complete resend, and resend requests can be sent ahead of final CRC if failure is deemed likely.

CRC block size can be tuned so the error correction works optimally for a given channel that allows reducing power in the channel to a minimum, at the cost of power and area for the correction hardware.

The QoR measure can be a signal good/bad bit ratio or a multi-bit value. Clocking the bit through even when it is bad is needed if the clock is being divided down to get the sub-channel clock, and to identify the end of transmission. QoR is a measure of the difference between the incoming signal difference integrators, the reliability of that measure will depend largely on channel noise, i.e. there will be more bad bits on a channel with poor SNR, so it will adapt dynamically—more early requests for resends are likely on a noisy channel.

In general, the QoR values indicate whether the channel is working efficiently, and can be used to tune the power level or other characteristics to get optimum performance.

Circuit Switched Networks

As an alternative to packet switched networks, individual SERDES links can be routed directly as analog signals. E.g. if adjacent clock system (CS) modules are communicating regularly through a smart SERDES controller (as IPv6), the controller can just route the incoming SERDES channel signal directly to the outgoing for minimum latency and power.

Buffering packets consumes resources and power, whereas direct connection of the links along with being bidirectional with dynamic control (on the sub channel) allows every IPV6 channel to be optimized individually for minimum power. While current SERDES interfaces like PCIe have a small number of connectors (<100), future systems with chiplets and with capacitive coupling will have orders of magnitude more, and minimizing power is critical to overall system performance.

In pass-through mode, the protocols are not decoded locally, but the analog signal relay can go through an (AI) signal reconditioner and the line protocol could be switched up or down to optimize the link use (e.g. RTZ-Pulse-amplitude modulation (PAM) to PAM-4). Likewise an electrical signal can be converted to optical or vice-versa.

Circuit-switched channels are also more secure than packet-switched paths since the hardware is not shared. Virtual channels can be reallocated to dedicated hardware dynamically if security requirements change.

Software Defined Networks (SDN)/Performance

In an IPv6 world, applications may use multiple channels of communication internally. Fine-tuning of performance may require promoting and demoting of channel models between circuit-switched, dedicated and multiplexed modes. With a shared channel, the virtual channels may be given individual priorities so that higher priority channels can be served faster.

In Ethernet there is the concept of a "jumbo frame", where a large block of data is transferred in one go (continuous period of time). Since a jumbo frame would normally block other communication, the Smart SERDES may break that into multiple small packets that can be sent in parallel, and interleaved with other channels.

The Smart SERDES hardware can report its routing structure (over IPv6) so that global routing software (management) can understand the complete network map (and make adjustments). Automatic local optimization could make mistakes when allocating low-traffic high-priority links. Low-volume low-priority traffic can be routed through the sub-channel. In addition, trial/training packets can be used to maintain tuning levels.

Stacked Boards

To achieve the maximum number of SERDES links, capacitive coupling can be used instead of solder bumps (since solder requires more spacing). Only physical alignment and clean surfaces are required to make this type of connections. If through-silicon vias (TSVs) are used to create capacitive coupling pads on the flip side of die, and die are soldered to both sides of an interposer, then stacking the assembled interposer boards such that the back of a die on one interposer aligns with the die on the next a highly connected 3-D computing device can be assembled.

If a stack of die is used the top one with the capacitive coupling may be a special purpose chip dedicated to that function, and can be manufactured in (say) a GaN/GaAs process for higher speed.

Wandering Threads

Wandering threads is an approach to computing where work, i.e., an operation or a call, is moved rather than data, it is particularly targeted at software requiring low-latency computing loops across multiple processors. Since the easiest level to patch fast communication into a processor is the L1 cache, the Smart SERDES hardware can be tuned for moving L1 cache lines (which is usually ~ eight words). In particular an instruction set architecture (ISA) like 128-bit RISC-V can have a direct equivalence between physical addresses and IPV6 addresses, and flushing a cache-line can be channeled directly into a (circuit-switched) Smart SERDES link, which brings core-to-core transfer times down to a few CPU cycles (rather than thousands).

Optical/RF SERDES

A similar approach can be taken with optical and RF links taking advantage of the fact that light and radio waves superimpose. Creating the equivalent (optically coherent) signal to the input in negative form and feeding that into the difference integrator (just a photo detector for optical links), a low-latency conversion of optical signals is possible. This approach would take advantage of the fact lasers like to synchronize (equivalent to PLL locking), so synchronizing a local laser to the remote transmitting laser is straightforward, and amplitude modulation (AM) is the easiest modulation for lasers. Phased-array mmWave communication works similarly to optical comms, and the equivalent of the laser resonance for PLL functionality is an L-C tank circuit. Laser and mmWave communication are both free-space technologies that work without wires as well as in fiber and waveguides, as with capacitive coupling (above), stacking boards back-to-back allows for 3D communication but with larger spacing. Wave guides can be created between boards by simply drilling holes through the spacer material (e.g. a common heat-sink plate). When using SerDes on an interposer, heat-sink(s) can also provide power or ground planes and mechanical support to the interposer (a thin and fragile glass type of material in one embodiment). In a stack of alternating heat-sinks and interposers, a different power supply can be provided to the interposer via the heat-sink to which the interposer is attached, thereby allowing the one or more heat-sinks to provide one or more levels of power. The heat sink can be 3D printed, e.g., using of powdered metallurgy such as copper or any heat conducting material.

System

Figure 4:
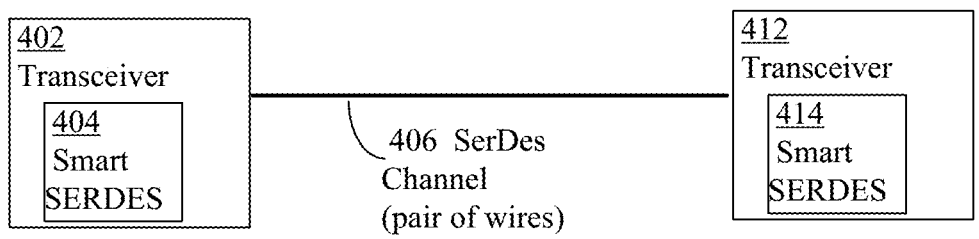
FIG. 4 is a functional block diagram of a system of transceivers for serializing a serial signal using AI, according to one or more embodiments.

Referring now to FIG. 4, a functional block diagram is shown of a system 400 of transceivers for serializing a serial signal using AI, according to one or more embodiments. System includes two transceivers 402 and 412, with smart SerDes 404 and 414, respectively disposed therein and coupled by a SerDes channel 406 with a pair of wires. Both the main and subchannel can be communicated on channel 406. Because both transceivers 402, 412 have the smart SerDes 404, 414, control and communication can occur therebetween for optimizing the tradeoff between power consumption and BER as well as requesting resends, as described above.

Applications

The flexible nature of the Smart SERDES allows things to be plugged in on standard interfaces like USB for power, and then appear as network objects over IPv6 without OS support. This is useful with personal computing devices that would otherwise have to connect over slower channels like WiFi, which are hard to secure (needing human intervention). In particular, Windows connects to computers with remote desktop protocol (RDP), and that can be used to talk to a "computing stick" plugged into USB, eSATA, or HDMI socket (the latter socket supplies power; Ethernet with PoE is another). If the same device is plugged into a charger which is connected through its cable into a scheme like "home energy management bus" (HEMBUS), it would also be available automatically on the home wired (power) network.

The computer readable and computer executable instructions reside, for example, in data storage features such as computer usable volatile and non-volatile memory and are non-transitory. However, the non-transitory computer readable and computer executable instructions may reside in any type of computer-usable storage medium.

Other Features

SERDES decoding by use of alternative signal prediction and comparative differencing.
Low frequency/amplitude bidirectional channel used for link control on same wires.
QoR driven CRC correction.
Back-to-back board stacking for 3D communication

Alternatives

The above advantages are exemplary, and these or other advantages may be achieved by the disclosure. Further, the skilled person will appreciate that not all advantages stated above are necessarily achieved by embodiments described herein.

In the foregoing specification, the disclosure has been described with reference to specific example embodiments. It will be evident, however, that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above-described operations are merely illustrative. The multiple operations may be combined into a single operation, a single operation may be distributed in additional operations and operations may be executed at least partially overlapping in time. Moreover, alternative embodiments may include multiple instances of a particular operation, and the order/sequence of operations may be altered in various other embodiments. Thus, one or more additional new operations may be inserted within the existing operations or one or more operations may be abbreviated or eliminated, according to a given application.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner, such as components packaged together in a module, or as components on board or a card. For example, processing in relation to different groups of profiles may be allocated to respective different integrated circuits.

Additionally, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, for example a Field Programmable Gate Array (FPGA).

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as "one, or more than one." Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are arbitrarily used to distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

As used throughout this application, the word "may" or "can" is used in a permissive sense (i.e., meaning having the potential or ability to do something), rather than the mandatory sense (i.e., meaning must). Similarly, the words "include," "including," and "includes" mean "including, but not limited to" the listed item(s).

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

Unless specifically stated otherwise as apparent from the foregoing discussions, it is appreciated that throughout the present description of embodiments, discussions utilizing terms such as "generating," "transmitting", "operating," "receiving," "aligning,", "scaling," "communicating," "executing," "replacing," or the like, refer to the actions and processes of an integrated circuit, an ASIC, a memory device, a computer system, or similar electronic computing device. The memory device or similar electronic computing device manipulates and transforms data represented as physical (electronic) quantities within the devices' registers and memories into other data similarly represented as physical quantities within the devices' memories or registers or other such information storage, transmission, or display devices.

I claim:

1. A method of processing an electronic signal ("signal") at a receiver,
the method comprising:
receiving the signal at the receiver as a received signal;
generating a plurality of expected waveforms in parallel, with each of the plurality of expected waveforms corresponding respectively to one of a plurality of possible symbols;
comparing a waveform of the received signal with each of the plurality of expected waveforms corresponding respectively to one of the plurality of possible symbols; and
ranking the received signal against each of the plurality of expected waveforms corresponding respectively to one of the plurality of possible symbols.

2. The method of claim 1, wherein:
interpreting the received signal according to a best match to one of the plurality of possible symbols.

3. The method of claim 1, wherein:
at least one of the following processes is not required:
reconstruction of the received signal at the receiver;
recovering a full clock;
utilizing a phase-locked loop;
filtering of the received signal; or
sampling of the received signal.

4. The method of claim 1, wherein:
the step of comparing is further comprised of:
choosing a most likely symbol for the received signal based on a best match of the received signal to one of the plurality of expected waveforms corresponding respectively to one of the plurality of possible symbols.

5. The method of claim 1, further comprising:
measuring a plurality of absolute differences between the waveform of the received signal respectively paired against each of the plurality of expected waveforms that corresponds respectively to one of the plurality of possible symbols; and
integrating, at each of a plurality of integrator blocks, respectively, one of the plurality of absolute differences.

6. The method of claim 1, further comprising:
generating each of the plurality of expected waveforms, corresponding respectively to one of the plurality of possible symbols, based on a charge-coupled device (CCD) loop for each of the plurality of expected waveforms.

7. The method of claim 1, wherein:
feeding a history of decoded symbols into a signal prediction block for selecting a next expected waveform.

8. The method of claim 1, further comprising:
training an artificial intelligence (AI) block with pattern signals on one or more different channels to generate a plurality of weight values, a reset signal, and the plurality of expected waveforms corresponding respectively to the plurality of possible symbols.

9. The method of claim 1, further comprising:
generating a channel model from physical information obtained during initialization; and
creating each of the plurality of expected waveforms corresponding respectively to one of the plurality of possible symbols utilizing the channel model.

10. The method of claim 1, further comprising:
evaluating other signals on one or more channels adjacent to a given channel carrying the signal; and
canceling crosstalk on the given channel arising from the one or more adjacent channels utilizing artificial intelligence (AI) and a plurality of symbol histories.

11. The method of claim 1, further comprising:
identifying a bit failure at a physical layer; and
attempting a repair first.

12. The method of claim 11, further comprising:
basing a repair of the bit failure on the ranked received signal against each of the plurality of expected waveforms corresponding respectively to one of the plurality of possible symbols.

13. A receiver for processing an electronic signal ("signal"), the receiver comprising:
a front end for receiving the signal as a received signal;
a signal prediction block for generating a plurality of expected waveforms in parallel, where each of the plurality of expected waveforms is corresponding respectively to one of a plurality of possible symbols; and
a comparator, coupled to the front end and the signal prediction block, for comparing a waveform of the received signal with each of the plurality of expected waveforms corresponding respectively to one of the plurality of possible symbols; and wherein:
the signal prediction block ranks the received signal against each of the plurality of expected waveforms corresponding respectively to one of the plurality of possible symbols.

14. The receiver of claim 13, wherein:
the signal prediction block interprets the received signal according to a best match to one of the plurality of possible symbols.

15. The receiver of claim 13, wherein:
at least one of the following circuits is not required:
a reconstruction circuit of the received signal at the receiver;
a full clock recovery circuit;
a phase-locked loop circuit;
a signal filtering circuit; or
a sampler circuit.

16. The receiver of claim 13, wherein:
the signal prediction block chooses a most likely symbol for the received signal based on a best match of the received signal to one of the plurality of expected waveforms corresponding respectively to one of the plurality of possible symbols.

17. The receiver of claim 13, further comprising:
a plurality of difference integrator blocks configured to:
measure a plurality of absolute differences between the waveform of the received signal respectively paired against each of the plurality of expected waveforms corresponding respectively to one of the plurality of possible symbols; and
integrate each of the plurality of absolute differences at one of a plurality of difference integrator blocks, respectively.

18. The receiver of claim 13, wherein:
the signal prediction block generates each of the plurality of expected waveforms corresponding respectively to one of the plurality of possible symbols based on a charge-coupled device (CCD) loop for each of the plurality of expected waveforms.

19. The receiver of claim 13, wherein:
the signal prediction block receives a history of decoded symbols for selecting a next expected waveform.

20. The receiver of claim 13, wherein:
the signal prediction block trains pattern signals from one or more different channels to generate a plurality of weight values, a reset signal, and the plurality of expected waveforms corresponding respectively to the plurality of possible symbols.

21. The receiver of claim 13, wherein:
the signal prediction block generates a channel model from physical information obtained during initialization, and creates each of the plurality of expected waveforms corresponding respectively to one of the plurality of possible symbols utilizing the channel model.

22. The receiver of claim 13, wherein:
the signal prediction block is configured to:
evaluate other signals on one or more channels adjacent to a given channel carrying the signal; and
cancel crosstalk on the given channel arising from the one or more adjacent channels.

23. The receiver of claim 13, wherein:
the signal prediction block is configured to:
superimpose a control signal at a frequency lower than a frequency of the received signal; and
communicate the control signal as at least one of a resend or a protocol change between the receiver and a transmitter.

24. The receiver of claim 13, wherein:
the signal prediction block is configured to:
identify a bit failure at a physical layer; and
attempt a repair first.

25. The receiver of claim 24, wherein:
the signal prediction block is configured to:
base a repair of the bit failure on the ranked received signal against each of the plurality of expected waveforms corresponding respectively to one of the plurality of possible symbols.

26. The receiver of claim 13, wherein:
the signal prediction block generates each of the plurality of expected waveforms corresponding respectively to one of the plurality of possible symbols based on a multiplexor selecting from a plurality of stored voltages.

* * * * *